United States Patent
Haussmann

(10) Patent No.: US 9,620,829 B2
(45) Date of Patent: Apr. 11, 2017

(54) COOLING DEVICE FOR A VEHICLE BATTERY, AND VEHICLE BATTERY WITH COOLING DEVICE

(71) Applicant: Valeo Klimasysteme GMBH, Bad Rodach (DE)

(72) Inventor: Roland Haussmann, Wiesloch (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 350 days.

(21) Appl. No.: 14/386,843

(22) PCT Filed: Mar. 21, 2013

(86) PCT No.: PCT/EP2013/055930
§ 371 (c)(1),
(2) Date: Sep. 22, 2014

(87) PCT Pub. No.: WO2013/139908
PCT Pub. Date: Sep. 26, 2013

(65) Prior Publication Data
US 2015/0086831 A1 Mar. 26, 2015

(30) Foreign Application Priority Data
Mar. 23, 2012 (DE) .................. 10 2012 005 871

(51) Int. Cl.
*H01M 10/625* (2014.01)
*H01M 10/6556* (2014.01)
(Continued)

(52) U.S. Cl.
CPC ....... *H01M 10/625* (2015.04); *H01M 10/613* (2015.04); *H01M 10/6556* (2015.04);
(Continued)

(58) Field of Classification Search
CPC ............ H01M 10/625; H01M 10/613; H01M 10/6568; H01M 10/6556
(Continued)

(56) References Cited

U.S. PATENT DOCUMENTS

| 600,227 A | 3/1898 | Knispel et al. |
| 4,109,707 A | 8/1978 | Wilson et al. |

(Continued)

FOREIGN PATENT DOCUMENTS

| EP | 2 541 669 A1 | 1/2013 |
| JP | H 10-332224 A | 12/1998 |
| WO | WO 2013/139905 A1 | 9/2013 |

OTHER PUBLICATIONS

International Search Report for Application No. PCT/EP2013/055926 dated Jun. 3, 2013, 3 pages.
(Continued)

*Primary Examiner* — Basia Ridley
*Assistant Examiner* — James Erwin
(74) *Attorney, Agent, or Firm* — Howard & Howard Attorneys PLLC

(57) ABSTRACT

A cooling device for a vehicle battery includes a cooling plate (22) comprising a first plate part (24) which faces towards the battery (10) and has a first wall thickness ($d_1$), a second plate part (30) which has a second wall thickness ($d_2$), and a multiplicity of depressions (32) formed in the second plate part (30). The cooling plate (22) includes a multiplicity of refrigerant ducts (34) with a first duct cross section, the refrigerant ducts being formed between the first and second plate parts (24, 30) in the depressions (32) of the second plate part (30). The cooling plate (22) also includes a distributor portion (42) and a collector portion which each have at least one connection (46) for a refrigerant feed line (56) and a refrigerant return line. The wall thickness (D) of the cooling plate (22) in the distributor portion (42) and/or collector portion (44) is greater than the wall thickness ($d_2$) of the second plate part (30).

16 Claims, 6 Drawing Sheets

(51) Int. Cl.
  *H01M 10/6568*  (2014.01)
  *H01M 10/613*   (2014.01)
  *H01M 10/653*   (2014.01)
(52) U.S. Cl.
  CPC ...... *H01M 10/6568* (2015.04); *H01M 10/653* (2015.04); *H01M 2220/20* (2013.01)
(58) Field of Classification Search
  USPC ........................................................ 429/120
  See application file for complete search history.

(56) References Cited

U.S. PATENT DOCUMENTS

| 4,136,729 A | 1/1979 | Sakaki |
| 5,205,348 A | 4/1993 | Tousignant et al. |
| 2011/0212355 A1 | 9/2011 | Essinger et al. |

OTHER PUBLICATIONS

International Search Report for Application No. PCT/EP2013/055930 dated Jun. 7, 2013, 3 pages.

English language abstract and machine-assisted English translation for EP 2 541 669 extracted from espacenet.com database on Oct. 8, 2014, 13 pages.

English language abstract and machine-assisted English translation for JPH 10-332224 extracted from PAJ database on Oct. 8, 2014, 26 pages.

COOLING DEVICE FOR A VEHICLE BATTERY, AND VEHICLE BATTERY WITH COOLING DEVICE

RELATED APPLICATIONS

This application is the National Stage of International Patent Application No. PCT/EP2013/055930, filed on Mar. 21, 2013, which claims priority to and all the advantages of German Patent Application No. 10 2012 005 871.3, filed on Mar. 23, 2012, the content of which is incorporated herein by reference.

The invention relates to a cooling device for a vehicle battery and to a vehicle battery with a cooling device according to the invention.

BACKGROUND

Vehicle batteries, in particular for electric vehicles or hybrid vehicles, must as far as possible be kept at constant temperature, for which reason use is made of so-called cooling devices for vehicle batteries. Said cooling devices comprise so-called cooling plates through which cooling liquid flows. The cooling plates are installed, as far as possible without a gap, on the outer side of the batteries for the purpose of dissipating heat or else heating up the battery.

Cooling devices are known in which the cooling plate is composed of two plate parts which are normally fastened directly to one another. Here, the first plate part is preferably planar, and the second plate part is preferably a deep-drawn or deformed metal sheet which has meandering depressions. Said depressions are closed by the planar plate part which is fastened to the deep-drawn plate part, such that refrigerant ducts are formed.

The numerous refrigerant ducts or refrigerant duct portions which extend through the cooling plate extend from one or more connections for feed lines or return lines. Here, a distributor portion and/or a collector portion and/or multiple such portions are provided as a transition between the connections. The flow is then either split up or merged in said portions or chambers. Upstream of the distributor portion or downstream of the collector portion there is positioned in each case one connection (normally for a tube or a hose) for the refrigerant feed line or return line.

SUMMARY OF THE INVENTION

It is an object of the invention to provide a robust cooling device for a vehicle battery.

Said object is achieved by means of a cooling device for a vehicle battery, having a cooling plate comprising a first plate part which faces towards the battery and has a first wall thickness, comprising a second plate part which has a second wall thickness, and comprising a multiplicity of depressions formed in the second plate part. The cooling plate has a multiplicity of refrigerant ducts with a first duct cross section, said refrigerant ducts being formed between the first and second plate parts in the depressions of the second plate part. The cooling plate furthermore has a distributor portion and a collector portion which each have at least one connection for a refrigerant feed line and a refrigerant return line. The wall thickness of the cooling plate in the distributor portion and/or collector portion is greater than the wall thickness of the second plate part. The distributor portion and the collector portion each constitute a chamber, proceeding from which the flow splits up and in which flows converge, respectively.

Whereas it was the case in the prior art that the distributor portion and the collector portion were formed from the second plate part alone and thus did not have an increased wall thickness, the invention advantageously provides an increased wall thickness in said region. As a result of said increased wall thickness, the load on the second plate part, arising in particular from movements or forces introduced in the region of the respective connection, is considerably reduced.

The first plate part is matched to the shape of the adjoining battery. Since the batteries usually have flat outer sides, the first plate part is in particular planar.

The flow cross section of the distributor portion and/or of the collector portion corresponds at least to two times the duct cross section of the individual refrigerant ducts, that is to say is considerably larger than the individual refrigerant ducts.

The flow cross section of the distributor portion and/or collector portion preferably corresponds to at least five times the duct cross section of the individual refrigerant ducts.

To provide adequate stability of the wall which forms the distributor portion and/or collector portion, it is provided in the preferred embodiment that the wall thickness of said wall or the wall thickness of one of the two portions is at least two times, preferably even five times, the second wall thickness. This therefore is not a minimal wall thickness increase but rather is a massive wall thickness increase.

The wall thickness of the first plate part is between 0.8 mm and 2 mm, and that of the second metal sheet is between 0.25 mm and 1 mm, wherein this is not imperatively the case but is preferable.

The width of the refrigerant ducts should be 0.5 mm to 12 mm, preferably 2 mm to 8 mm, and more preferably 4 mm to 6 mm.

It is furthermore advantageous for the refrigerant ducts to have a U-shaped or, more generally, meandering profile and for a plurality of refrigerant ducts to be formed as outgoing lines or return lines in respectively associated regions of the cooling plate. This makes it possible for a small number of connections to be provided, because connections always constitute weak points of a cooling device. The cooling plate may furthermore be kept very uniformly at low temperatures if almost its entire surface is supplied via coolant ducts.

The duct cross section of the refrigerant ducts is preferably of semi-circular cross section, that is to say the production of the second plate part may be performed by deep drawing. Furthermore, it is self-evidently also possible for the second plate part to be formed as a cast part or injection-moulded part of if appropriate also as an extruded part. The second plate part may self-evidently also be produced from the solid.

A further embodiment of the invention can provide that the distributor portion and/or the collector portion are formed at least in portions by the second plate part, and an additional component is provided, which reinforces the second plate part in the region of the distributor portion and/or of the collector portion and together with it forms the wall of the distributor portion and/or of the collector portion at least in portions. In the distributor or collector portion there is thus formed a type of sandwich construction in which the second plate part duly partially forms the wall but only together with the component. Said embodiment is advantageous because the refrigerant ducts are formed in the second plate part and no connection point which could lead to leakages is provided between the second plate part and the distributor portion or collector portion. This is the case because the second plate part also jointly forms the distributor portion and/or the collector portion. It is self-evidently advantageous in this connection if the component is provided at the outside on the second plate part, such that the second plate part is continuous at the inside and defines both the refrigerant ducts and also the distributor portion and/or the collector portion at the inside.

It can also be provided that the wall of the distributor portion and/or of the collector portion is formed at least in portions by a component additional to the first and second plate parts. The additional component is, so to speak, connected to the second plate part. Furthermore, it is also conceivable for the reinforcement part, at the outside, to support the second plate part and, in another region at the inside, to define a portion of the wall of the distributor portion or of the collector portion.

The additional component preferably forms in portions the wall of the distributor portion and/or of the collector portion, which wall has a greater wall thickness than the second plate part.

The connection for the coolant feed and/or return line may be formed on the additional component.

The additional component is in particular of shell-shaped form. The distributor portion and/or the collector portion are closed by the first plate part in order to form the chamber of the distributor or collector portion.

A very stable construction in the region of the distributor portion and/or of the collector portion is attained if one of said portions is arranged on that side of the first plate part which is situated opposite the second plate part. Passage openings in the first plate part then form the inlet and outlet openings of the refrigerant ducts. Since the first plate part normally has a greater wall thickness than the second plate part, the load in the distributor and/or collector portion is transmitted at least partially, preferably completely, to the first plate.

As an alternative to this, the distributor portion, the collector portion and/or the connecting duct may be arranged together with the second plate part on one side of the first plate part. In this embodiment, it is possible for the passage openings in the first plate part to be omitted.

The cooling device according to the invention may self-evidently also comprise a plurality of cooling plates, with in each case dedicated or common distributor portions and/or collector portions for the individual cooling plates being provided and at least two cooling plates being connected in series or parallel.

If a deformable, heat-conducting, electrically insulating layer is arranged between the planar surface of the first plate part and a surface, which is to be cooled, of the vehicle battery, it is possible for tolerances to be compensated. Furthermore, it is ensured that no air gap is present between the first plate part and the battery.

The first and the second plate part should be directly connected to one another by means of one or more common joining surfaces, which may be realized for example by clinching, soldering, in particular brazing or other cohesive connection methods.

To permit good heat conduction, the first and/or the second plate part are metal sheets. The second plate part is preferably deformed in order to form the depressions.

BRIEF DESCRIPTION OF THE DRAWINGS

The invention furthermore relates to a vehicle battery having a multiplicity of battery cells and having a cooling device according to the invention.

Further features and advantages of the invention will emerge from the following description and from the following drawings, to which reference will be made. In the drawings.

DETAILED DESCRIPTION

Figure 1:
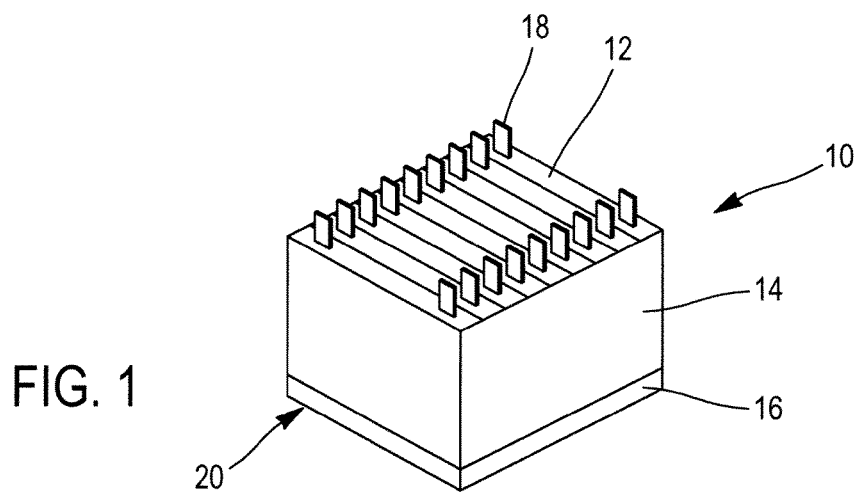
FIG. 1 shows a perspective view of a vehicle battery according to the invention with cooling device according to the invention.

FIG. 1 shows a vehicle battery 10 which is provided for driving a vehicle and which is assembled from a large number of cells 12. The battery 10 has outer walls 14 and an underside 16. The contacts 18 are provided for example on the top side, wherein this arrangement is not imperatively necessary.

The vehicle battery 10 is equipped with a cooling device 20 which, in the present example, completely covers the underside 16 and makes contact therewith over its full area. Additionally or alternatively to this, one or more outer walls 14 may be provided with cooling devices 20.

The cooling device 20 is matched to the geometry of the vehicle battery 10 in the region of the contact area.

In the present case, the cooling device 20 comprises a sandwich-like cooling plate 22 which is of planar form toward the underside 16.

If the corresponding contact surface of the vehicle battery 10 has some other form, the cooling plate 22 has a complementary form matched thereto in order to ensure contact over the full area.

The cooling plate 22 (see FIGS. 2 and 3) has a first plate part 24 which has a top side 26 which constitutes the contact surface or the surface facing towards the vehicle battery 10. A second plate part 30 is provided on the opposite side 28 of the plate part 24.

The second plate part 30 is preferably composed, like the first plate part 24, of a metal sheet. By contrast to the first plate part 24, the second plate part 30 is however formed with numerous depressions 32 which are closed off by the first plate part 24 in order to form refrigerant ducts 34.

Figure 3:
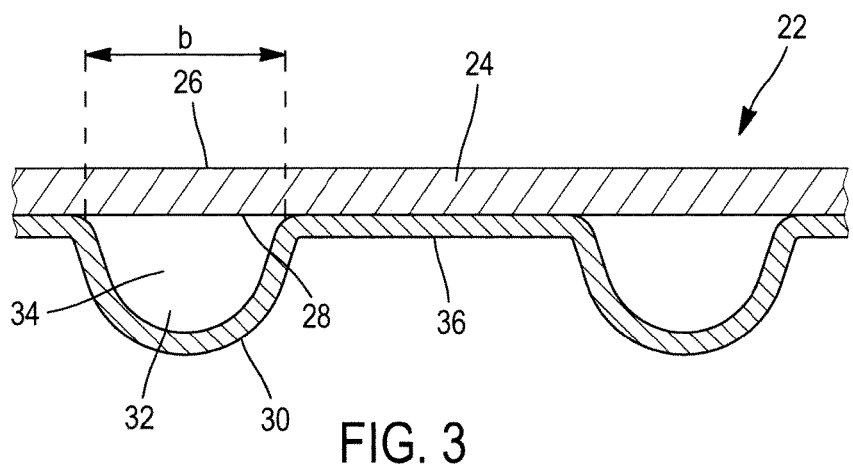
FIG. 3 shows a sectional view through the cooling device along the line III-III in FIG. 2.

In the embodiment as per FIG. 3, said refrigerant ducts 34 have a semi-circular duct cross section.

The second plate part 30 has joining surfaces 36 by means of which it bears against the side 28 of the first plate part 24 over the full area. In said region, the two plate parts 24, 30 are connected to one another in a liquid-tight manner, for example by means of cohesion (soldering, adhesive bonding, welding) and/or by means of positive locking, for example crimping.

Figure 2:
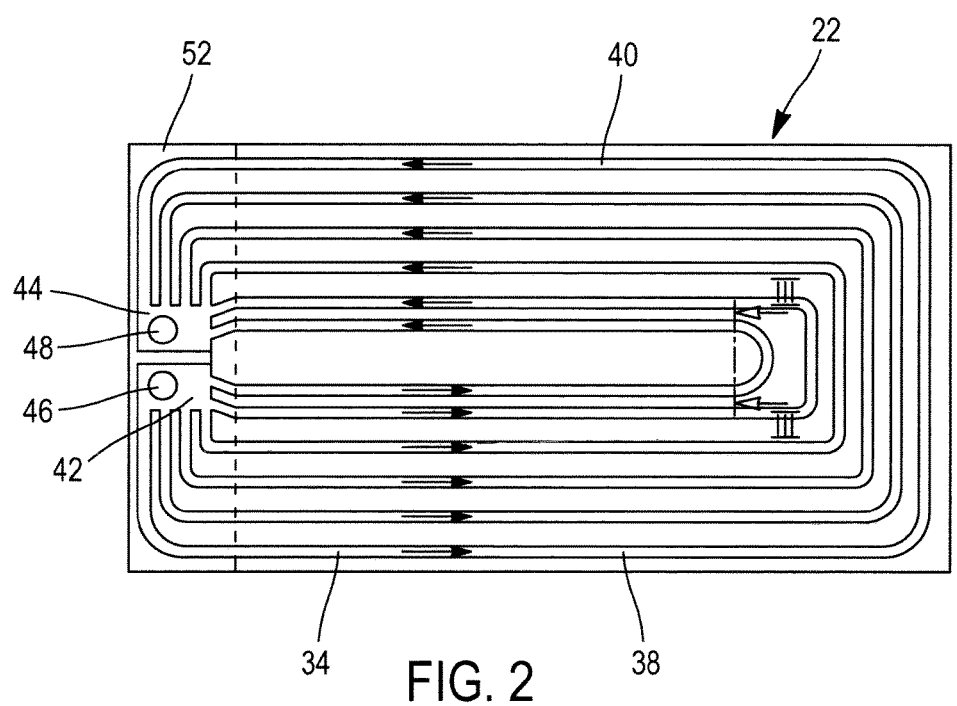
FIG. 2 shows a view from below of the cooling device according to the invention which can be used in the vehicle battery as per FIG. 1.

It can be seen in FIG. 2 that refrigerant ducts extend over the entire cooling plate 22, which refrigerant ducts run substantially parallel and, in the exemplary embodiment shown, have a U-shaped profile with outgoing and return lines 38, 40.

The coolant flows via a refrigerant feed line and a first connection 46, in particular an inlet connection 46, into a so-called distributor portion 42 which is formed by a relatively large depression in the second plate part 30. The refrigerant ducts 34 then branch off from the distributor portion 42 in order to flow from one end of the cooling plate 22 to the opposite end before subsequently flowing back again in an arc. The refrigerant ducts 34 then open out in a collector portion 44 which is formed as a common depression corresponding to the distributor portion 42. From the collector portion 44, the refrigerant is conducted to a second connection 48, in particular an outlet connection 48, which is coupled to the refrigerant return line.

In the embodiment shown, the connections 46 and 48 are situated on the same side of the cooling plate 22 and closely adjacent to one another. As an alternative to this, it would self-evidently also be possible for the two connections 46, 48 to be arranged on the opposite ends of the cooling plate 22.

Figure 4:
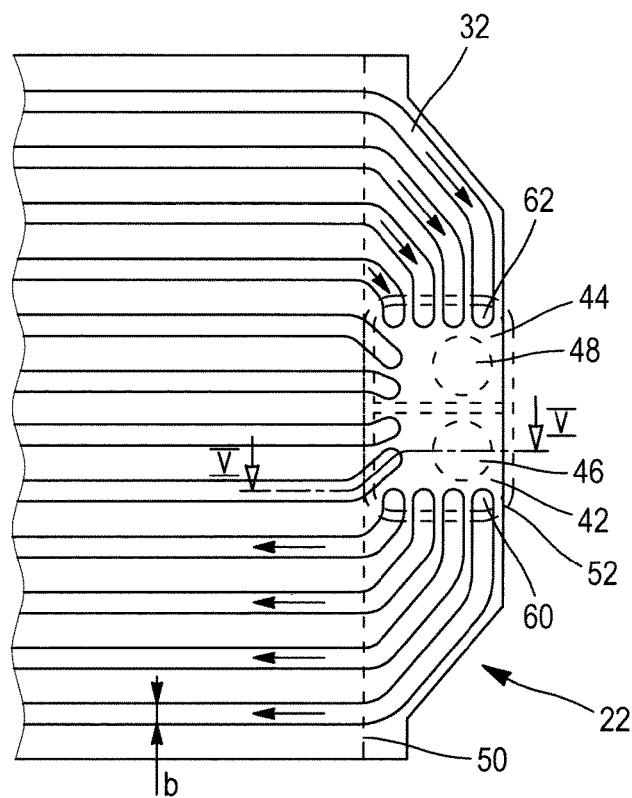
FIG. 4 shows a view from below of a cooling device according to a further embodiment of the invention in the region of one end of the cooling device.

The embodiment as per FIG. 4 corresponds substantially to that in FIGS. 2 and 3, wherein dashed lines indicate the edge 50 of the vehicle battery 10, and wherein the cooling plate 22 protrudes laterally beyond the edge 50. The distributor portion and the collector portion 44 are formed in the protruding part of the cooling plate 22, and the connections 46, 48 are also provided in said region. Here, too, the cooling plate 22 is formed substantially from the first plate part 24 and the second plate part 30, corresponding to the embodiment as per FIGS. 2 and 3.

Figure 5:
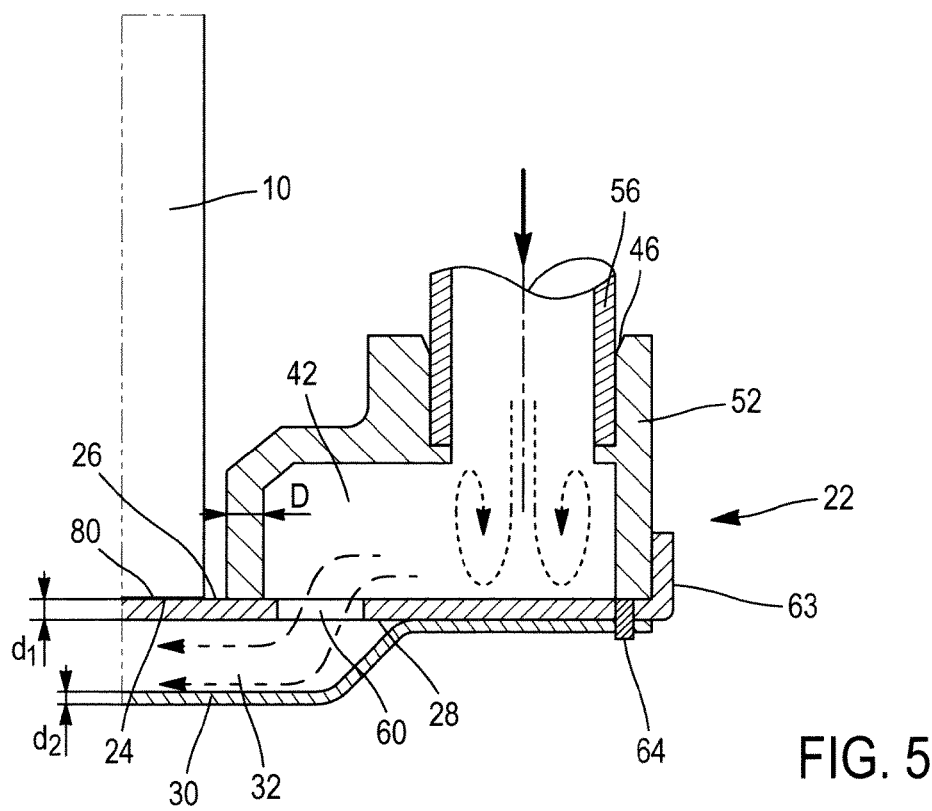
FIG. 5 shows a sectional view through the cooling device as per FIG. 4 along the line V-V.

FIG. 5 shows the section through the cooling plate 22 in the region of the distributor portion 42. The distributor portion 42 is seated on the top side 26 of the first plate part 24, said top side being situated opposite the side 28 adjoined by the first plate part 30. The distributor portion 42 is formed by an additional component 52 which is for example a cast component or the like. The component 52 has a depression which is closed by the first plate part 24 in order to form the distributor portion 42. The component 52 has a connection 46 for a refrigerant feed line 56. The connection 46 is in the present case formed as a receptacle into which the tube which forms the refrigerant feed line 56 can be plugged and for example soldered therein.

The component 52 is preferably also provided, and correspondingly designed, in the region of the collector portion 44. As an alternative to this, two components 52 may be provided, one for the distributor portion 42 and the other for the collector portion 44.

A plurality of passage openings 60 extend in the first plate part 24 proceeding from the distributor portion 42, which passage openings connect the distributor portion 42 to the individual refrigerant ducts 32 and form inlet openings. The refrigerant thus flows from the distributor portion 42 to the opposite side 28 of the plate part 24. This is realized correspondingly in the collector portion 44, that is to say it is also the case here that passage openings 62 are provided in the first plate part 24 for forming outlet openings and for the passage of the refrigerant back into the collector portion 44.

The wall thickness of the distributor portion 42, the latter in this case being defined by the component 52, is relatively large. The smallest wall thickness D in the region of the distributor portion 42 is in any case greater than the wall thickness $d_2$ of the second plate part 30.

Furthermore, the wall thickness $d_1$ of the first plate part 24 is greater than, preferably is two to five times greater than, the wall thickness D.

The wall thickness $d_1$ of the first plate part 24 is greater than or equal to the wall thickness $d_2$ of the second plate part 30, wherein the wall thickness $d_1$ is preferably greater than, in particular is two to five times greater than, the wall thickness $d_2$.

The component 52 may for example be milled from the solid, may be an extruded part or may be produced by deep drawing or some other deformation or injection moulding process. This also applies for all other embodiments.

The fastening of the component 52 to the first plate part 24 may be realized by means of cohesion and/or positive locking, for example by means of flanging along the edge 63 of the first plate part 24 or clinching or the provision of projections or studs 64 to be deformed. The second plate part 30 and the component 52 may be pre-mounted on the first plate part before the cohesive connection, in particular the soldered connection, is produced. This, too, applies for all embodiments.

Figure 6:
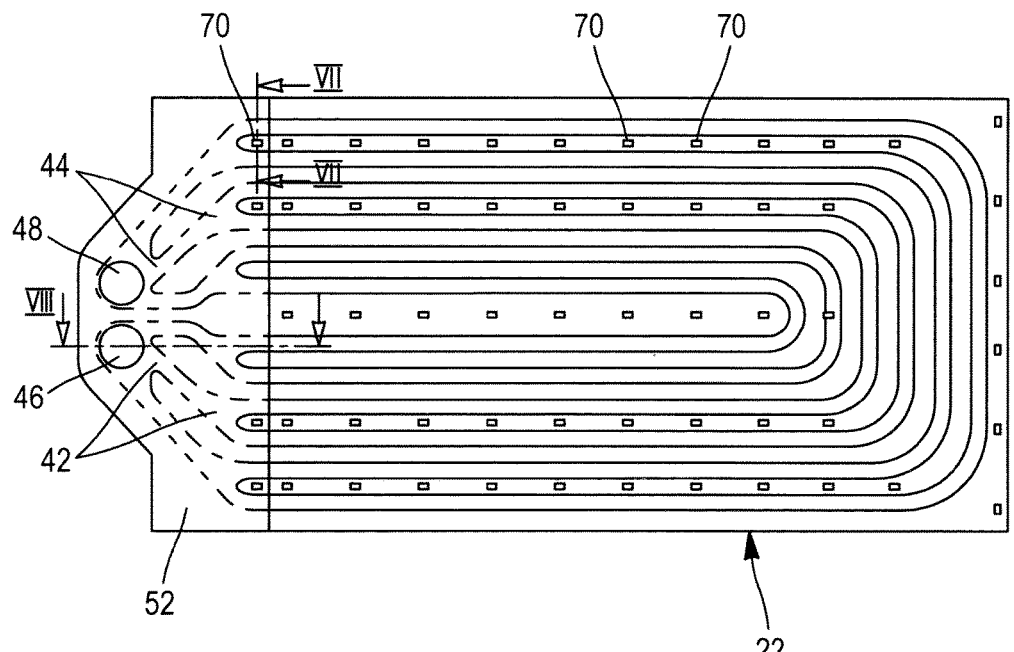
FIG. 6 shows a view from below of a cooling device according to yet a further embodiment of the invention.
Figure 7:
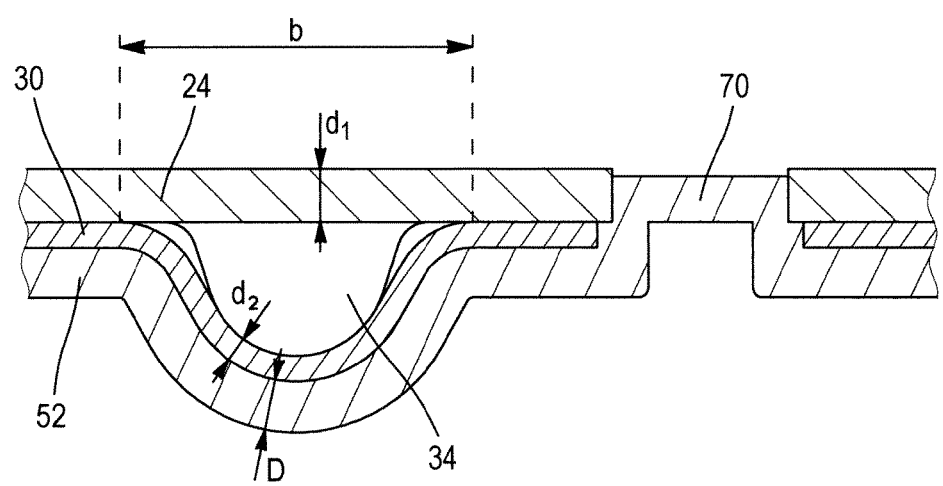
FIG. 7 shows a sectional view through the cooling device as per FIG. 6 along the line VII-VII.

FIGS. 6 and 7 show a modified embodiment. Here, the component 52 is arranged on that side 28 of the first plate part 24 on which the second plate part 30 is also provided. Here, the component 52 supports the second plate part 30 at the outside, preferably by virtue of said component having a complementary form and thus nestling against the second plate part 30.

It can be seen in FIG. 6 that the component 52 does not cover the entire second plate part 30, but rather is provided only at an end of the second plate part 30 at which the connections 46, 48 and the distributor portion 42 and the collector portion 44 are also provided.

Figure 8:
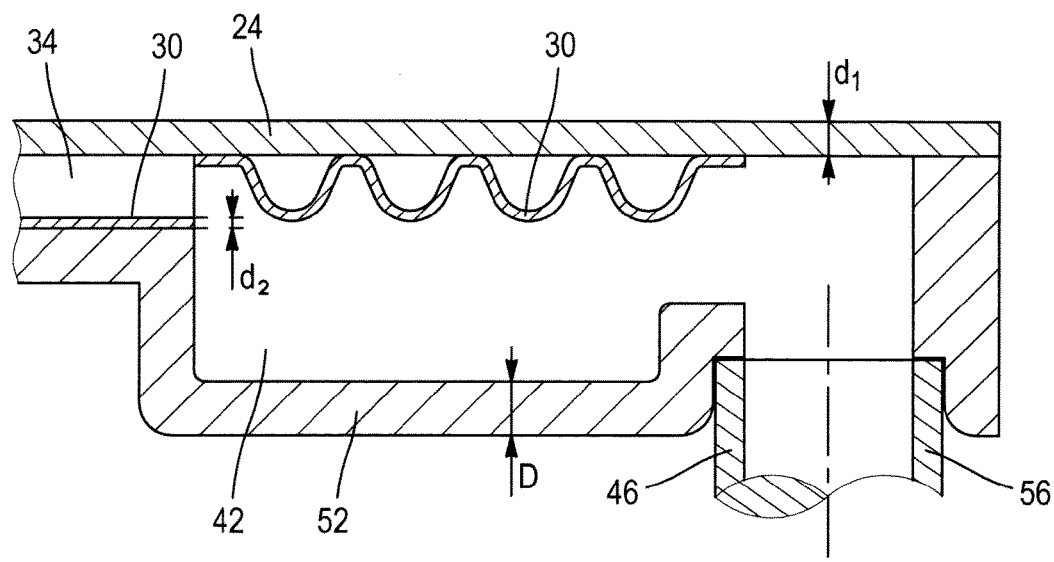
FIG. 8 shows a sectional view through the cooling device as per FIG. 6 along the line VIII-VIII.

FIG. 8 shows diagrammatically that, in the region of the connection 46 and of the distributor portion 42, the wall of the distributor portion 42, said wall being formed by the component 52, again has a wall thickness D significantly greater than the wall thickness $d_2$ of the second plate part 30.

There are portions in which the component 52 and the second plate part 30 overlap and in which the wall thickness (see FIG. 7) is, so to speak, formed by a sum of the wall thicknesses D and $d_2$.

The component 52 may be fixed to the first plate part 24 for example in a positively locking manner by clinch connections 70 (see FIG. 7), if appropriate with the second plate part 30 being clamped in between. Cohesive connections may self-evidently additionally be provided, such that the clinch connection 70 constitutes only a preliminary connection.

Clinch connections can be formed even without the second component 52, as shown for example in FIG. 7 by the rectangles to the right of the component 52. Said clinch connections 70 are produced by means of a direct connection of the second plate part 30 to the first plate part 24, wherein then, the second plate part 30 is pressed into receiving openings in the first plate part 24, analogously to the connection as per FIG. 7.

It is also the case in the embodiment as per FIGS. 6 and 8 that the connection 46 of the cooling plate 22 to the refrigerant feed line 56 is realized by means of a dedicated component 52 which is fastened to the first and/or second plate part 24, 30 and which has a considerably greater wall thickness than the second plate part 30.

Figure 9:
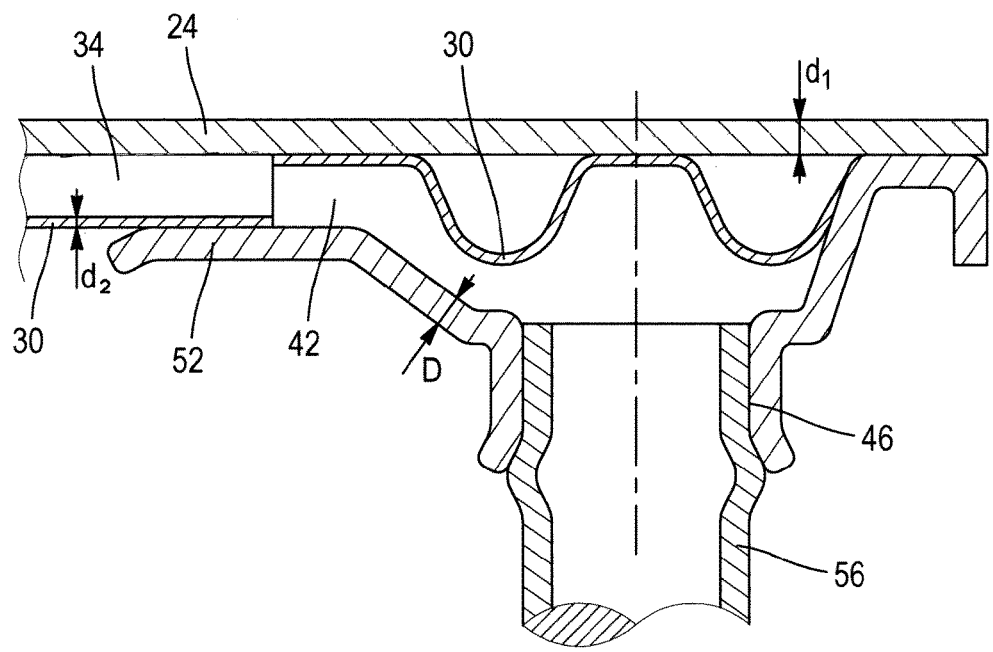
FIG. 9 shows a sectional view through the cooling device in the region of a connection, an alternative to the embodiment as per FIG. 8.

The embodiment in FIG. 9 is a variant of the embodiment in FIG. 8. Here, too, a separate component 52 is provided which has the connection 46 for the refrigerant feed line 56. Here, too, the wall thickness D is considerably greater than the wall thickness $d_2$ of the second plate part 30. The connection of the component 52 in the region of the connection 46 to the refrigerant line 56 is realized by means of deformation, for example plastic deformation and/or cohesion.

Whereas the component 52 as per FIG. 8 is produced for example by chip-removing machining processes or extrusion, the component 52 as per FIG. 9 is produced in particular by deep drawing.

It must be mentioned that the corresponding connections 46, 48 and components 52 (including the wall thickness relationships thereof) are provided not only for the refrigerant feed line but correspondingly also for the refrigerant return line. Furthermore, it is advantageous for the component 52 to also form, either on its own or together with the second plate part 30, the depression for forming the distributor portion and/or the collector portion, because the greater wall thickness in said portions is of particular importance. Specifically, pressures of 20 bar may arise in the cooling plate 22, more precisely in the refrigerant ducts 34. The refrigerant ducts 34 must even withstand burst pressures of greater than 50 bar.

The component 52 is composed in particular of aluminium.

The refinements according to FIGS. 7 to 9 may self-evidently also be applied to the embodiment according to FIG. 2. Here, it is then the case that the component 52 is not provided on a portion which protrudes partially beyond the battery 10. The component 52 is indicated in FIG. 2 by dashed lines.

Figure 10:
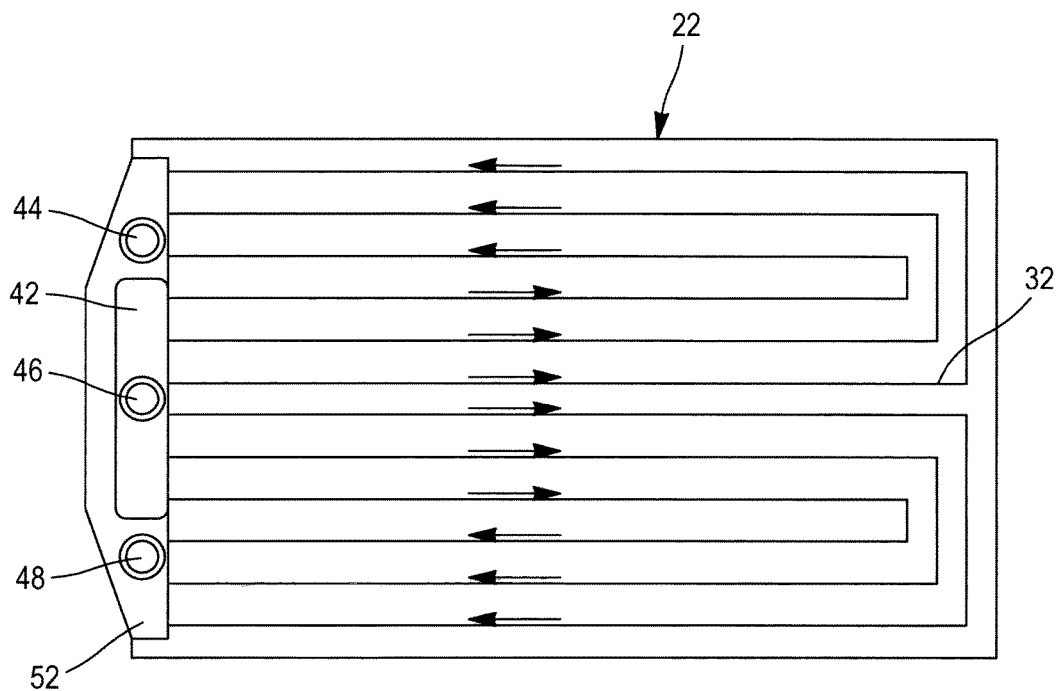
FIG. 10 shows an alternative embodiment of the cooling device according to the invention with a different refrigerant duct profile.

In the embodiment as per FIG. 10, the collector portion 44 is formed as a relatively large chamber which surrounds the centrally arranged distributor portion 42. From the distributor portion 42 there extend coolant ducts 34 which each run outwards before returning in a large "U" shape and then opening into the collector portion 44.

The refrigerant ducts 34 run in bundled form in a longitudinal direction of the cooling plate 22 proceeding from the central distributor portion 42. At the opposite end of the cooling plate 22, the bundle of refrigerant tubes 34 divides into two partial bundles which each return, in the outer regions of the cooling plate 22, to the collector portion 44.

It is alternatively also possible for the distributor portion 42 to be formed as a relatively large chamber which surrounds a centrally arranged collector portion 44, wherein the refrigerant ducts 34 are guided analogously.

In said embodiment, too, a separate component 52 is provided which has a large wall thickness and which adjoins or overlaps the second plate part 30 and which forms the distributor portion 42 and the collector portion 44 and also the connections 46, 48 for the refrigerant lines.

For all embodiments, it is the case that the wall thickness D of the component 52 in the region of the distributor portion 42 and/or of the collector portion 44 is at least two times, preferably at least five times the wall thickness $d_2$ of the second plate part 30.

Furthermore, in all embodiments, the first plate part 24 preferably has a wall thickness $d_1$ of 0.8 to 2 mm. Furthermore, the second plate part has a wall thickness $d_2$ of between 0.25 and 1 mm.

It is likewise advantageous for all embodiments if the width b of the refrigerant ducts lies between 0.5 and 2 mm, preferably between 2 mm and 8 mm, and more preferably between 4 and 6 mm.

Furthermore, the flow cross section of the distributor and collector portions 44, 46 is at least twice as large as the duct cross section of the individual refrigerant ducts 34.

One possibility for eliminating an air gap between the top side 26 and the battery 10 may (see FIG. 5) optionally be a deformable, heat-conducting, electrically insulating layer 80. This is in particular a soft silicone mat with ceramic additives.

The advantages of the said design consist in particular in the compactness and stability in the region of the connections 44, 46. Furthermore, despite the stability, it is possible to realize small wall thicknesses for the plate parts 24, 30. Furthermore, the connections 44, 46 preferably project perpendicularly from the first plate part 24, such that the compactness of the vehicle battery together with cooling device is maintained. Specifically, the refrigerant lines may then be guided very closely along the outer walls 14.

Furthermore, in all embodiments, the distributor portion 42 and collector portion 44 are integrated into the cooling plate 22, that is to say no tube lines are provided between the refrigerant ducts 34 and a separate distributor or collector portion 42 or 44. This likewise ensures a high degree of compactness of the cooling device 20.

It is self-evidently also possible for a plurality of cooling devices 20 to be provided for one vehicle battery 10.

Figure 11:
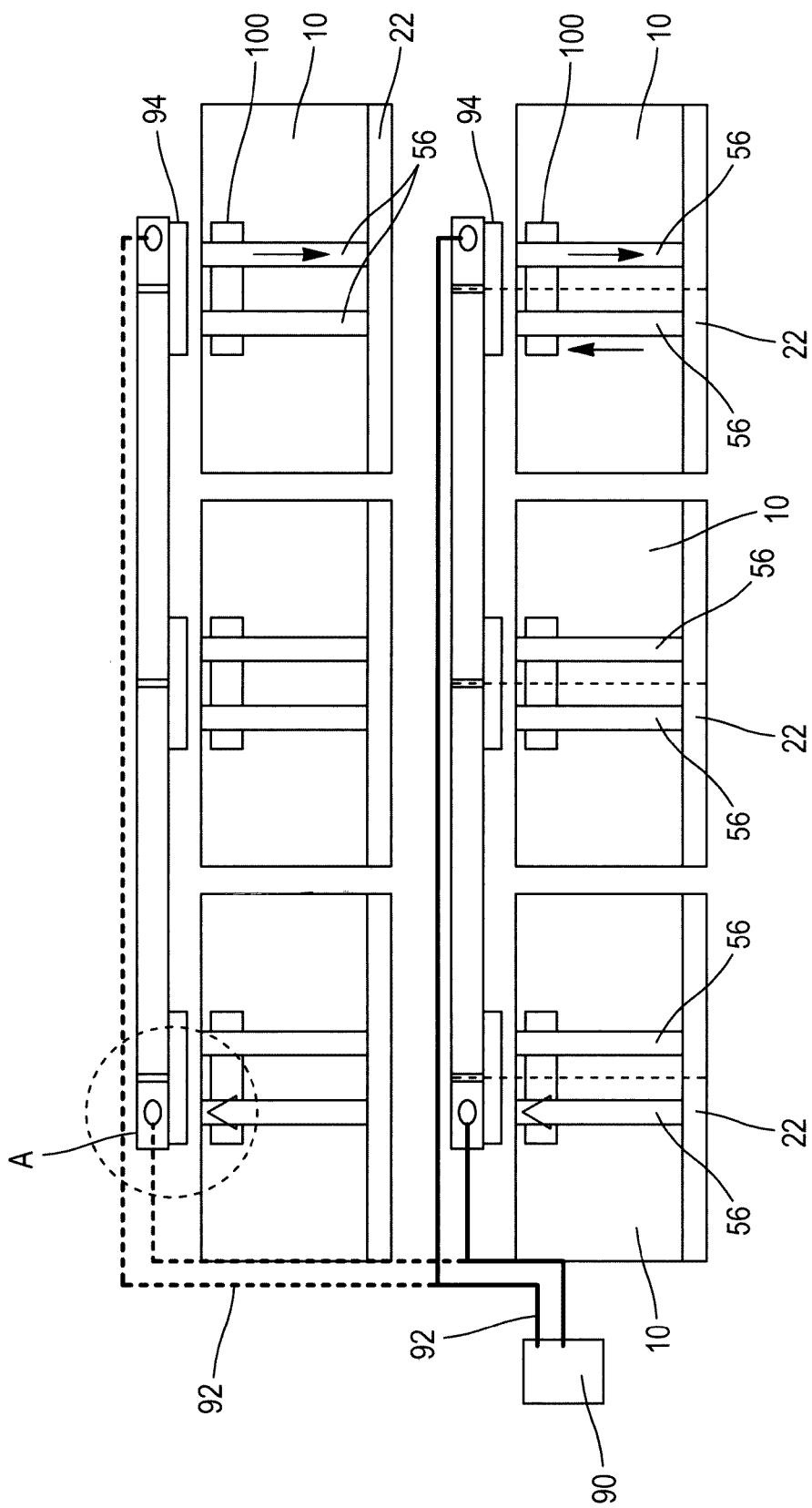
FIG. 11 shows a side view of a plurality of vehicle batteries according to the invention which are coupled to one another with regard to the coolant flow.

Furthermore, it is also possible for a plurality of vehicle batteries 10 to be coupled to cooling devices 20 connected in series or parallel, as shown in FIG. 11 on the basis of six vehicle batteries 10.

The upper three vehicle batteries 10 are cooled by means of cooling devices 20 that are connected in series. The branch of the three series-connected cooling devices 20 of the upper vehicle batteries 10 is parallel to the branch of the three series-connected cooling devices 20 of the lower vehicle batteries 10. The reference numeral 90 denotes a main distributor for refrigerant, from which lines 92 extend.

Figure 12:
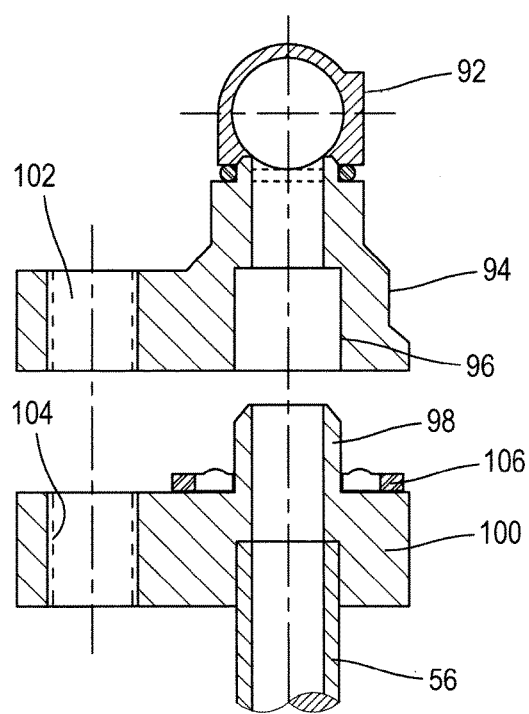
FIG. 12 shows an enlarged view of the bordered region labelled A in FIG. 11, showing the connection of a refrigerant duct to the cooling device.

The peculiarity of the embodiment as per FIGS. 11 and 12 consists in that the lines 92 can be connected by means of simple plug connections to the refrigerant feed lines 56 and return lines which lead to the cooling plates 22.

The lines 92 are fastened to first coupling parts which have receptacles 96. Projections 98 on a second coupling part 100 can be inserted into the receptacles 96. Refrigerant lines 56 are attached to the second coupling part 100. The coupling parts 94, 100 are connected to one another for example by means of screw connections. For this purpose, one of the coupling parts 94 has, for example, an opening 102, and the other coupling part 100 has a thread 104 for the attachment of a screw. Said type of fastening is however merely one example. Seals 106 may be provided. This embodiment permits fast and simple mounting and dismounting of the cooling plates 22 and of the units composed of battery 10 and cooling device 20.

The invention claimed is:

1. A cooling device for a vehicle battery, the cooling device comprising a cooling plate (22) comprising:
    a first plate part (24) facing towards the battery (10) and having a first wall thickness ($d_1$),
    a second plate part (30) having a second wall thickness ($d_2$) and a multiplicity of depressions (32),
    a multiplicity of refrigerant ducts (34) with a first duct cross section, the refrigerant ducts being formed between the first plate parts (24) and second plate parts (30) in the depressions (32) of the second plate part (30),
    a distributor portion (42) having at least one connection (46, 48) for a refrigerant feed line (56) and a refrigerant return line, and
    a collector portion (44) having at least one connection (46, 48) for a refrigerant feed line (56) and a refrigerant return line,
    wherein a wall thickness (D) of the cooling plate (22) in the distributor portion (42) and/or collector portion (44) is greater than the second wall thickness ($d_2$) of the second plate part (30).

2. The cooling device according to claim 1, wherein the flow cross section of the distributor portion (42) and/or of the collector portion (44) corresponds at least to two times the duct cross section of the individual refrigerant ducts (34).

3. The cooling device according to claim 1, wherein the wall thickness (D) of the distributor portion (42) and/or of the collector portion (44) is at least two times the second wall thickness ($d_2$).

4. The cooling device according to claim 1, wherein the first wall thickness ($d_1$) of the first plate part (24) is 0.8 mm to 2 mm.

5. The cooling device according to claim 1, wherein the wall thickness ($d_2$) of the second plate part (30) is 0.25 mm to 1 mm.

6. The cooling device according to claim 1, wherein the width (b) of the refrigerant ducts (34) is 0.5 mm to 12 mm.

7. The cooling device according to claim 1, wherein the refrigerant ducts (34) have a U-shaped profile and a plurality of refrigerant ducts (34) are formed as outgoing lines (38) or return lines (40) in respectively associated regions of the cooling plate (22).

8. The cooling device according to claim 1, wherein a duct cross section of the refrigerant ducts (34) is of substantially semi-circular form.

9. A vehicle battery having a multiplicity of battery cells (12) and having a cooling device (20) according to claim 1.

10. A cooling device according to claim 2, wherein the wall thickness (D) of the distributor portion (42) and/or of the collector portion (44) is at least two times the second wall thickness ($d_2$).

11. A cooling device according to claim 10, wherein the wall thickness ($d_1$) of the first plate part (24) is 0.8 mm to 2 mm.

12. A cooling device according to claim 10, wherein the wall thickness ($d_2$) of the second plate part (30) is 0.25 mm to 1 mm.

13. A cooling device according to claim 10, wherein the width (b) of the refrigerant ducts (34) is 0.5 mm to 12 mm.

14. A cooling device according to claim 2, wherein the refrigerant ducts (34) have a U-shaped profile and a plurality of refrigerant ducts (34) are formed as outgoing lines (38) or return lines (40) in respectively associated regions of the cooling plate (22).

15. A cooling device according to claim 14, wherein a duct cross section of the refrigerant ducts (34) is of substantially semi-circular form.

16. A vehicle battery having a multiplicity of battery cells (12) and having a cooling device (20) according to claim 15.

* * * * *